(12) United States Patent
Huang et al.

(10) Patent No.: US 11,333,936 B2
(45) Date of Patent: May 17, 2022

(54) ELECTRONIC DEVICE

(71) Applicant: InnoLux Corporation, Miao-Li County (TW)

(72) Inventors: Huai-Ping Huang, Miao-Li County (TW); Chih-Lung Lin, Miao-Li County (TW); Chang-Chiang Cheng, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/932,821

(22) Filed: Jul. 19, 2020

(65) Prior Publication Data
US 2021/0048718 A1 Feb. 18, 2021

(30) Foreign Application Priority Data
Aug. 14, 2019 (CN) .......................... 201910750815.4

(51) Int. Cl.
| | |
|---|---|
| *G02F 1/1343* | (2006.01) |
| *G02F 1/1335* | (2006.01) |
| *G06K 9/00* | (2022.01) |
| *G06F 3/044* | (2006.01) |
| *G02F 1/1333* | (2006.01) |

(52) U.S. Cl.
CPC .... *G02F 1/134309* (2013.01); *G02F 1/13338* (2013.01); *G02F 1/133528* (2013.01); *G06F 3/0445* (2019.05); *G06K 9/0002* (2013.01); *G02F 1/134354* (2021.01)

(58) Field of Classification Search
CPC ........... G02F 1/134309; G02F 1/13338; G02F 1/133528; G02F 1/134354; G06F 3/0445; G06K 9/0002
See application file for complete search history.

(56) References Cited

U.S. PATENT DOCUMENTS

| | | | |
|---|---|---|---|
| 2018/0039349 A1* | 2/2018 | Han | G06F 3/04164 |
| 2018/0039815 A1* | 2/2018 | Jung | G06F 1/1643 |
| 2020/0074134 A1* | 3/2020 | Lim | G06K 9/0002 |
| 2021/0279440 A1* | 9/2021 | Son | G06K 9/00 |

\* cited by examiner

*Primary Examiner* — Nathanael R Briggs
(74) *Attorney, Agent, or Firm* — Winston Hsu (57) ABSTRACT

The present disclosure provides an electronic device, and the electronic device includes a plurality of touch sensing electrodes and a plurality of ultrasonic fingerprint sensing electrodes. The plurality of ultrasonic fingerprint sensing electrodes are disposed on the plurality of touch sensing electrodes, and a portion of the plurality of touch sensing electrodes are not overlapped with the plurality of ultrasonic fingerprint sensing electrodes.

19 Claims, 9 Drawing Sheets

ELECTRONIC DEVICE

BACKGROUND OF THE DISCLOSURE

1. Field of the Disclosure

The present disclosure relates generally to an electronic device and more particularly, to an electronic device having a fingerprint sensing function.

2. Description of the Prior Art

Generally, fingerprint sensing can be utilized for personal identification, and therefore, with the development of electronic devices, the fingerprint sensing function is also integrated in various electronic devices and widely used. However, it is still an important issue for the industry to determine the positions of the fingerprint sensing electrodes on the electronic devices.

SUMMARY OF THE DISCLOSURE

The present disclosure provides an electronic device. The electronic device includes a plurality of touch sensing electrodes and a plurality of ultrasonic fingerprint sensing electrodes. The plurality of ultrasonic fingerprint sensing electrodes are disposed on the plurality of touch sensing electrodes, and a portion of the plurality of touch sensing electrodes are not overlapped with the plurality of ultrasonic fingerprint sensing electrodes.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

FIG. 2 to FIG. 3 are schematic diagrams illustrating an electronic device according to a second embodiment of the present disclosure; in which:

DETAILED DESCRIPTION

The present disclosure may be understood by reference to the following detailed description, taken in conjunction with the drawings as described below. For purposes of illustrative clarity understood, various drawings of this disclosure show a portion of the electronic device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component with the same functions by different names. In the following description and in the claims, the terms "include", "comprise" and "have" are used in an open-ended fashion, and thus should be interpreted to mean "include, but not limited to".

It may be also understood that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

The technical features in different embodiments described in the following can be replaced, recombined, or mixed with one another to constitute another embodiment without departing from the spirit of the present disclosure.

Figure 1:
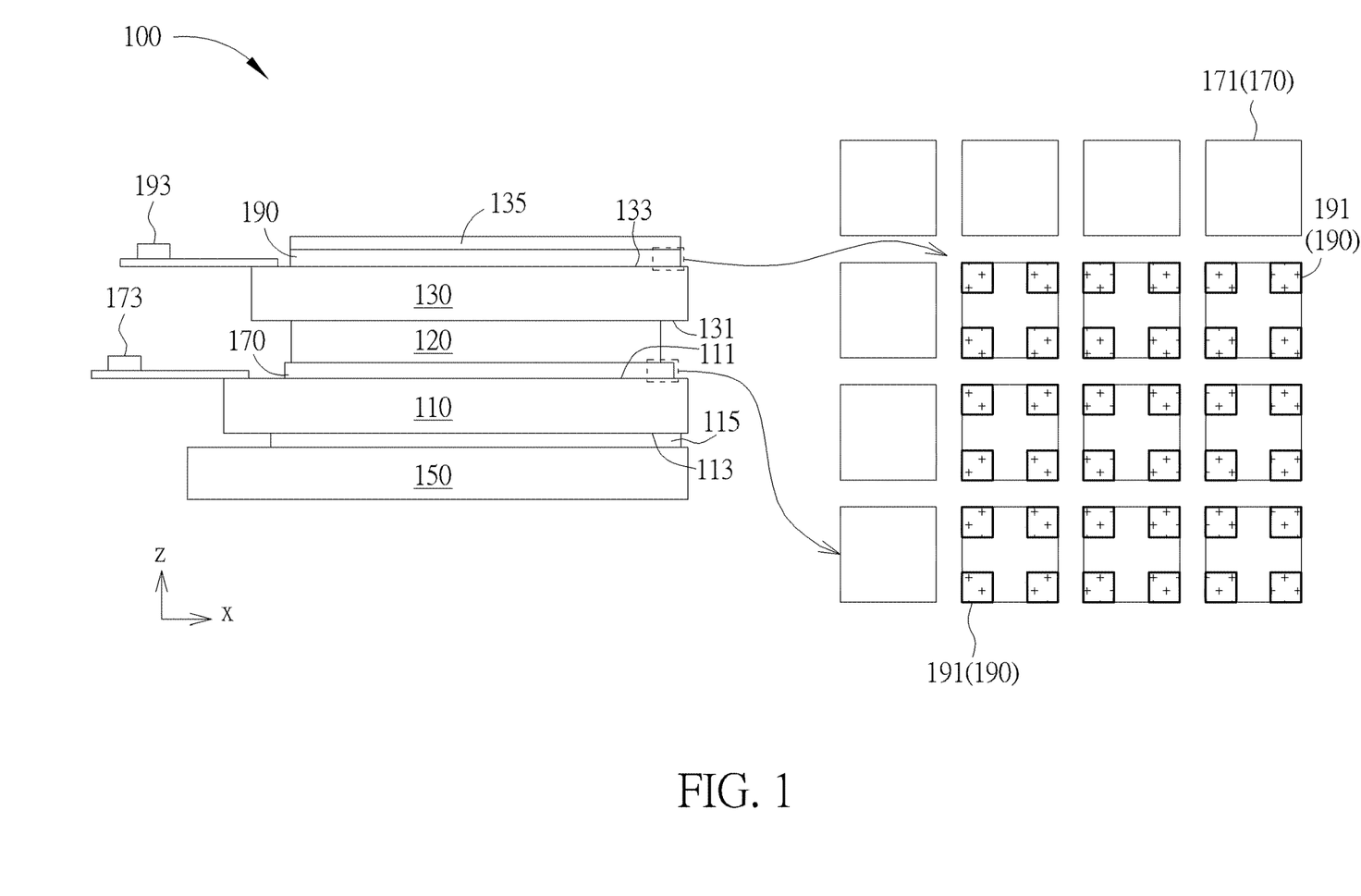
FIG. 1 is a schematic diagram illustrating an electronic device according to a first embodiment of the present disclosure.

Please refers to FIG. 1, which illustrating an electronic device according to a first embodiment of the present disclosure, wherein the left side of FIG. 1 illustrates a cross-sectional view of the electronic device 100, and the right side of FIG. 1 illustrates a top view of a portion of touch sensing electrodes 171 and a portion of fingerprint sensing electrodes 191 in the electronic device 100. Firstly, as shown in the left side of FIG. 1, the electronic device 100 includes a first substrate 110, a second substrate 130, and touch sensing elements 170 and fingerprint sensing elements 190 disposed respectively on the first substrate 110 and the second substrate 130. The first substrate 110 and the second substrate 130 may respectively include, for example, a rigid substrate or a flexible substrate, wherein the material thereof may include, for example, glass, quartz, sapphire, polyimide (PI), polyethylene terephthalate (PET), polycarbonate (PC), Polyether sulfones (PES), polybutylene terephthalate (PBT), polyethylene naphthalate (PEN), polyarylate (PAR), other suitable materials or a combination thereof, but is not limited thereto.

The electronic device 100 of the present embodiment is described in detail by using a liquid crystal display device as an example, and the electronic device of the present disclosure is not limited thereto. Specifically speaking, the first substrate 110 and the second substrate 130 are disposed opposite to each other, and the first substrate 110 and the second substrate 130 are respectively configured as an array substrate having an array circuit formed thereon and an opposite substrate. In one embodiment, the second substrate 130 may include a color filter disposed thereon to form a color filter substrate, but is not limited thereto. In some embodiments, the array circuit and the color filter may be formed on the same substrate. The first substrate 110 includes an inner side 111 and an outer side 113 opposite to each other, the second substrate 130 also includes an inner side 131 and an outer side 133 opposite to each other, and the inner side 111 of the first substrate 110 faces (or close to) the inner side 131 of the second substrate 130, wherein a medium layer 120 is disposed between the inner side 111 of the first substrate 110 and the inner side 131 of the second substrate 130. In the present embodiment, the medium layer 120 may include a liquid crystal layer, but the present disclosure is not limited thereto. On the other hand, a bottom polarizer 115 and a top polarizer 135 are respectively disposed on the outer side 113 of the first substrate 110 and outer side 133 of the second substrate 130, to adjust the polarization of lights that finally emitted from the electronic device 100. In the present embodiment, the back light 150 may be a self-light-emitting module, such as an organic light-emitting diode (OLED) or an inorganic light-emitting diode (LED). The inorganic light-emitting diode may be, for example, a micro light-emitting diode (micro-LED), a mini light-emitting diode (mini-LED) or a quantum dot light-emitting diode (QLED/DQLED), but not limited thereto. In another embodiment, the back light 150 may also include cold cathode fluorescent lamp (CCFL), fluorescence material, phosphor, quantum dot (QD), other suitable materials or any combination thereof. In some embodiments, the electronic device 100 may include the medium layer 120 capable of self-light-emitting, such as an organic light-emitting diode or an inorganic light-emitting diode, wherein the inorganic light-emitting diode may be, for example, a micro light-emitting diode, a mini light-emitting diode or a quantum dot light-emitting diode, but not limited thereto. It is noted that, while the electronic device 100 includes the medium layer 120 capable of self-light-emitting, the back light 150 and/or the bottom polarizer 115 may be omitted.

In the present embodiment, an array circuit may be disposed on the first substrate 110, and the touch sensing elements 170 may be integrated into the array circuit, for example, the touch sensing elements 170 are disposed at the inner side 111 of the first substrate 110, and between the first substrate 110 and the medium layer 120, but the present disclosure is not limited thereto. In the present embodiment, the touch sensing electrodes 171 of the touch sensing elements 170 may be patterned by using a patterning process to form a plurality of touch sensing electrodes 171 as shown in the right side of FIG. 1. The touch sensing electrodes 171 are disposed with an interval to form an array arrangement, and it can be used to distinguish and to receive touch sensing signals from different positions. In the present embodiment, the touch sensing electrodes 171 may respectively include the same dimension and shape, as shown in the right side of FIG. 1. However, people skilled in the art should understand the shape, the dimension and the arrangement of the touch sensing electrodes 171 as shown FIG. 1 are only for examples, and the practical shape, dimensions and arrangement of the touch sensing electrodes 171 may be adjusted according to practical requirements and are not limited thereto. The fingerprint sensing elements 190 are disposed on the touch sensing elements 170, for example, the fingerprint sensing elements 190 are disposed on the outer side 133 of the second substrate 130, between the top polarizer 135 and the second substrate 130. One of the fingerprint sensing elements 190 includes a fingerprint sensing electrode 191, and the plurality of the fingerprint sensing electrodes 191 of the electronic device 100 at least partially overlap the plurality of touch sensing electrodes 171 underneath. In other words, at least a portion of the touch sensing electrodes 171 are not overlapped with the fingerprint sensing electrodes 191. Specifically, one of the touch sensing electrodes 171 may be partially overlapped with two or more fingerprint sensing electrodes 191, and another portion of the same touch sensing electrode is not overlapped with the fingerprint sensing electrodes 191. In the present embodiment, the fingerprint sensing electrodes 191 may be disposed with an interval in a top view of the electronic device 100, to overlap a portion of the touch sensing electrodes 171, and another portion of the touch sensing electrodes 171 is not overlapped with the fingerprint sensing electrodes 191. In the present embodiment, the overlapped portion of one touch sensing electrode 171 and the fingerprint sensing electrodes 191 is about 10% to 70% of the area of the touch sensing electrode 171 (10%≤area ratio of the overlapped portion≤70%), or about 33% to 55% of the area of the touch sensing electrode 171 (33%≤area ratio of the overlapped portion≤55%). However, the area ratio is not limited to that shown in FIG. 1, and it may include other area ratios according to practical requirements. Also, the materials of the touch sensing electrodes 171 and the fingerprint sensing electrodes 191 may be optionally the same as or different from each other. For example, the touch sensing electrode 171 and the fingerprint sensing electrode 191 may include conductive materials, such as a conductive material with good light transmission, like indium tin oxide (ITO), or other metal materials with better conductivity, but not limited thereto. If the fingerprint sensing electrodes 191 completely overlap the touch sensing electrodes 171, the fingerprint sensing electrodes 191 may shield the touch sensing signals of the touch sensing electrodes 171, thereby affecting the touch sensing function of the touch sensing element 170.

The electronic device 100 includes a fingerprint sensing circuit 193 coupled to the fingerprint sensing elements 191, and includes a touch sensing circuit 173 coupled to the touch sensing elements 170. Specifically, the fingerprint sensing circuit 193 is coupled to the fingerprint sensing electrodes 191, and touch sensing circuit 173 is coupled to the touch sensing electrodes 171, to receive signals transmitted from the touch sensing elements 170 or the fingerprint sensing elements 190, respectively. In the present embodiment, the fingerprint sensing elements 190 may be ultrasonic fingerprint sensors. The ultrasonic fingerprint sensors produce ultrasonic waves through vibration and transmit the ultrasonic waves to a finger for sensing the fingerprint, and then the sensing signals are transmitted to the fingerprint sensing circuit 193 to identify the fingerprint. However, in other embodiments, the fingerprint elements 190 are not limited to the ultrasonic fingerprint sensors, and they may include other options, such as optical fingerprint sensors or other suitable fingerprint sensors. Furthermore, one of the fingerprint sensing elements 190 of the present embodiment may include the same length in two different directions (such as in the x-direction and in the y-direction), to show a square, a rhombus or other suitable shapes. People skilled in the art should understand that some drawings (such as FIG. 1 and FIG. 2) only illustrate a portion or a cross-section of the fingerprint sensing elements 190, and may not present the specific shape of the fingerprint sensing element 190 completely. Accordingly, the fingerprint sensing elements 190 such as the ultrasonic fingerprint sensors may be integrated into the electronic device 100 (for example, the sensors are disposed on the outer side 133 of the second substrate 130), to reduce the entire thickness of the electronic device 100.

Figure 2:
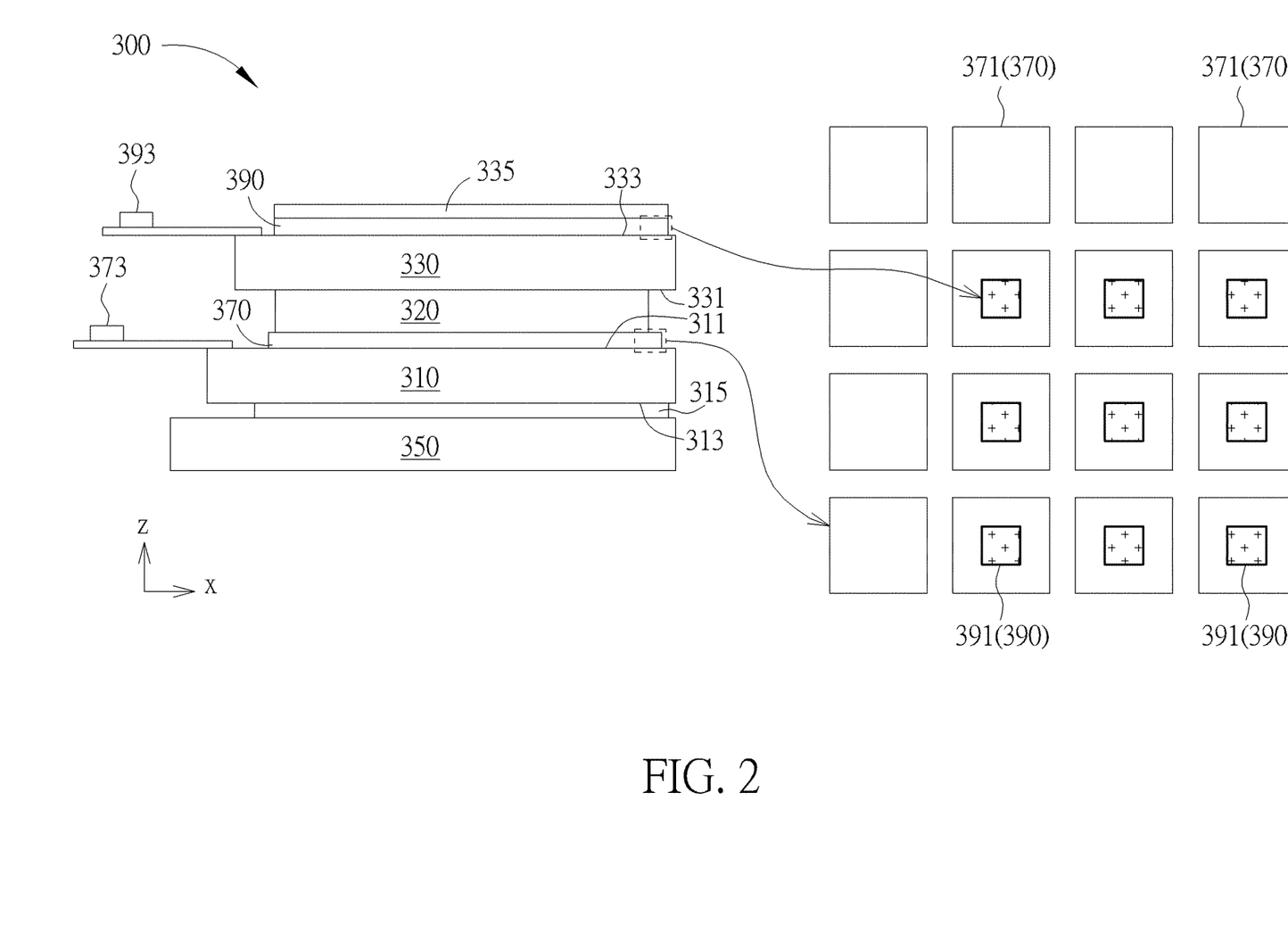
FIG. 2 shows a cross-sectional view of the electronic device and a top view of some elements of the electronic device.
Figure 3:
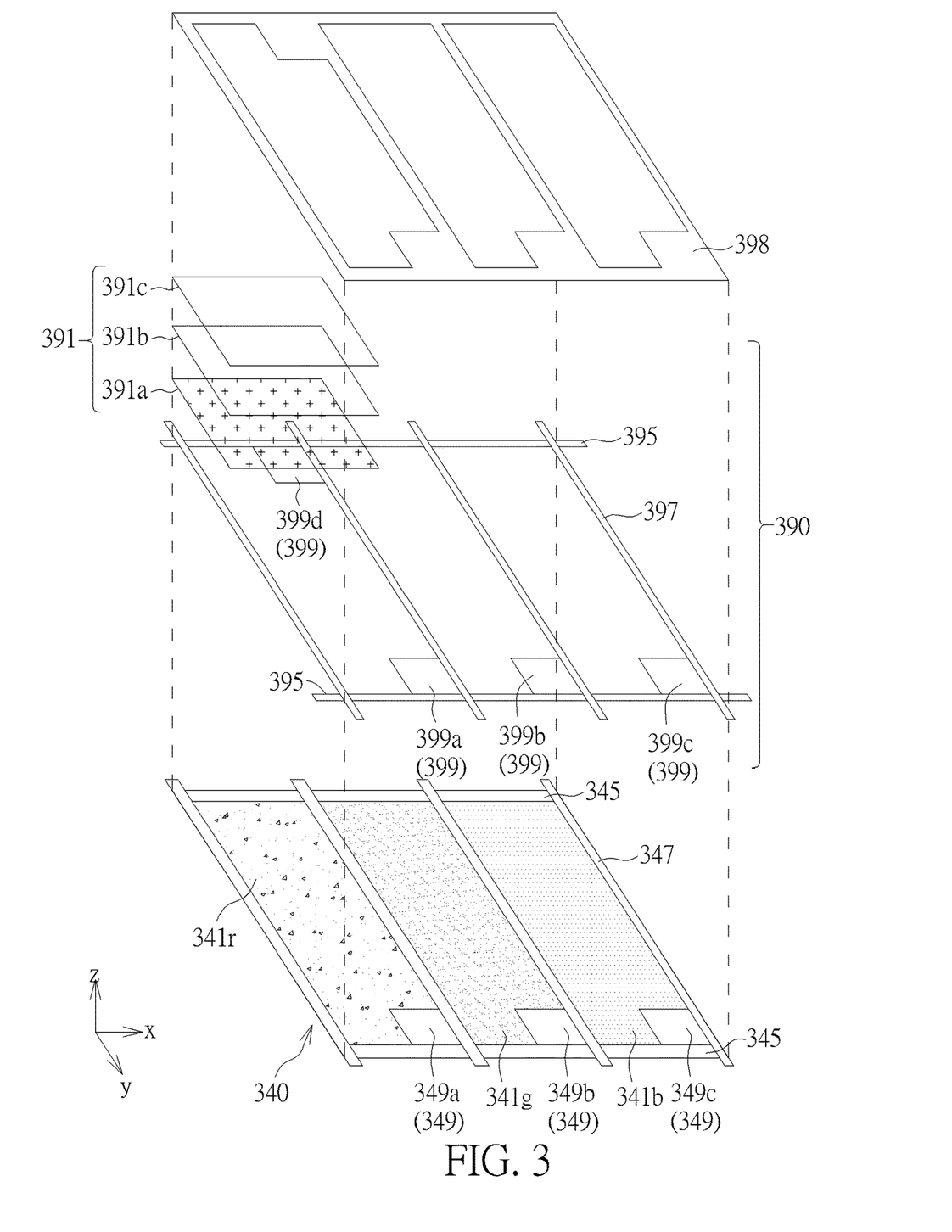
FIG. 3 shows an exploded view of fingerprint sensing element in the electronic device.

Please refer to FIG. 2 and FIG. 3, which show schematic diagrams illustrating an electronic device 300 according to a second embodiment of the present disclosure, wherein the left side of FIG. 2 illustrates a cross-sectional view of the electronic device 300, the right side of FIG. 2 illustrates a top view of a portion of touch sensing electrodes 371 and a portion of fingerprint sensing electrodes 391 in the electronic device 300, and FIG. 3 illustrates an exploded view of a fingerprint sensing element 390. Firstly, as shown in the left side of FIG. 2, the electronic device 300 of the second embodiment also includes a first substrate 310 (having an inner side 311 and an outer side 313 opposite to each other), a bottom polarizer 315, a medium layer 320, a second substrate 330 (having an inner side 331 and an outer side 333 opposite to each other), a top polarizer 335, a back light 350 and a touch sensing element 370 (including the touch sensing electrodes 371) and a touch sensing circuit 373, features of the aforementioned components are substantially the same as those of the first embodiment and may not be redundantly described hereinafter. The difference between the first embodiment and the present embodiment is that one of the touch sensing electrodes 371 is overlapped with only one of fingerprint sensing electrodes 391, as shown in the right side of FIG. 2. While in the first embodiment, one of the touch sensing electrodes 171 may simultaneously correspond to a plurality of fingerprint sensing electrodes 191.

It is noted that, people skilled in the art should easily understand that the overlapping of the fingerprint sensing electrodes 391 and the touch sensing electrodes 371 is not limited to the aforementioned embodiments, and it may include other examples. For example, in one embodiment, the disposing density of the fingerprint sensing electrodes 391 may be further adjusted, and a portion of the fingerprint sensing electrodes 391 may cross the gap between two adjacent touch sensing electrodes 371 to simultaneously overlap two or more touch sensing electrodes 371.

Please refer to FIG. 3, the amount of the fingerprint recognition signals may be positively related to the area of the fingerprint sensing electrodes 391. Accordingly, when the area of the fingerprint sensing electrodes 391 is reduced, the amount of received signals thereof may be reduced thereby. Specifically, as shown in FIG. 3, in the embodiment having the ultrasonic fingerprint sensor as the fingerprint sensing element 390, the fingerprint sensing electrode 391 includes a bottom electrode layer 391a, a piezoelectric film 391b and a top electrode layer 391c stacked sequentially from bottom to top. It is noted that, the bottom electrode layer 391a, the piezoelectric film 391b, and the top electrode layer 391c shown in FIG. 3 are only for schematic illustration, and the practical area thereof may be adjusted and according to practical requirements. The bottom electrode layer 391a and the top electrode layer 391c are respectively grounded or provided with a voltage, and the piezoelectric film 391b may be deformed by the voltage difference between the bottom electrode layer 391a and the top electrode layer 391c, thereby leading to vibration to produce ultrasonic waves. When the area of the fingerprint sensing electrode 391 is reduced, the area of the piezoelectric film 391b is reduced correspondingly, which will affect the range where the ultrasound emits and rebounds. In the present embodiment, the area of the fingerprint sensing electrodes 391 is properly reduced to maintain the functions of the fingerprint sensing electrodes 391 and the touch sensing electrodes 371. As an example, the area of the fingerprint sensing electrode 391 is reduced to make the overlapped portion of the fingerprint sensing electrodes 391 and the touch sensing electrodes 371 be about 10% to 70% of the area of the touch sensing electrodes 371 (10%≤area ratio of the overlapped portion≤70%), or about 33% to 55% of the area of the touch sensing electrodes 371 (33%≤area ratio of the overlapped portion≤55%). Through these arrangements, the functions of the fingerprint sensing electrodes 391 and the touch sensing electrodes 371 are maintained at the same time. It is also noted that, in the present embodiment, the areas of the bottom electrode layer 391a, the piezoelectric film 391b, and the top electrode layer 391c are substantially the same, and in other embodiments, the areas of the bottom electrode layer 191a, the piezoelectric film 391b, and the top electrode layer 391c may be different. While the areas of the bottom electrode layer 191a, the piezoelectric film 391b, and the top electrode layer 391c are different, the area of the bottom electrode 391a is referred as the area of the fingerprint sensing electrode 391.

On the other hand, the fingerprint sensing element 390 further includes a plurality of crossed wires and switching elements to receive and to process signals generated by the fingerprint sensing electrode 391, wherein the switching elements may be thin film transistors such as amorphous silicon thin film transistors, low temperature polysilicon thin film transistors or metal oxide thin film transistors, but is not limited thereto. In some embodiments, the electronic device may include a combination of different switching elements mentioned above, but is not limited thereto. In some embodiments, the fingerprint sensing element 390 may include a plurality of fingerprint scan lines 395 extended along the x-direction and arranged in the y-direction, a plurality of fingerprint data lines 397 extended along the y-direction and arranged in the x-direction, and a plurality of switching elements 399. In the present embodiment, the fingerprint sensing element 390, for example, includes at least four switching elements 399, but not limited thereto. The four switching elements 399 may be controlled by the same or different fingerprint scan lines 395 and fingerprint data lines 397 respectively, to respectively perform various functions such as the signal peak detection function, the control function, the signal read out function and signal reset function of the fingerprint sensing element 390. The signal peak detection function is referred to as the piezoelectric film 391b vibrates to produce ultrasonic waves, and the ultrasonic waves are transmitted to the fingers and rebound, the piezoelectric film 391b converts the rebounded ultrasonic waves into electrical signals, and the electrical signals are then transmitted from the bottom electrode layer 391a and recorded in a switching element 399a. The signal peak detection function is also known as the storage function. Next, referring to the control function, the magnitude of the electrical signals which are recorded after the aforementioned signal peak detection function are determined based on originally established fingerprint signals through another switching element 399b. Then, referring to the signal read out function, the received signals are transmitted to the fingerprint sensing circuit 393 through another switching element 399c. Referring to the reset function, the read-out signals which are no longer needed are then washed out (reset) by the last switching element 399d. It is noted that, the corresponding functions of the switching elements 399 are not limited to above mentioned functions, and the corresponding functions of the switching elements 399 may be further adjusted according to practical designs.

In the present embodiment, the positions of the switching elements 399, the fingerprint scan lines 395, and the fingerprint data lines 397 of the fingerprint sensing element 390 may be optionally overlapped with the array circuit disposed on the second substrate 330. Also, a plurality of pixels 340 are further disposed on the inner side 311 of the first substrate 310 in an array arrangement. The pixel 340 respectively includes at least three sub-pixels such as the sub-pixel 341r, the sub-pixel 341g, and the sub-pixel 341b configured to display red light, greed light and blue light respectively, and the sub-pixel 341r, the sub-pixel 341g, and the sub-pixel 341b are respectively controlled by different switching elements (such as the thin film transistors) including the switching element 349a, the switching element 349b and the switching element 349c, but not limited thereto. In the present embodiment, the fingerprint sensing element 390 is corresponding to the pixel 340, and the three switching elements including the switching element 399a, the switching element 399b and the switching element 399c of the four switching elements 399 of the fingerprint sensing element 390 may optionally overlap the three switching elements including the switching element 349a, the switching element 349b and the switching element 349c of the three sub-pixels including the sub-pixel 341r, the sub-pixel 341g, and the sub-pixel 341b in the z-direction, respectively, and the fingerprint scan lines 395 and the fingerprint data lines 397 of the fingerprint sensing element 390 may overlap the scan lines 345 and data lines 347 coupled to the switching element 349a, the switching element 349b, and the switching element 349c, respectively, as shown in FIG. 3. The fingerprint sensing electrodes 391 (such as the bottom electrode layer 391a) may overlap the pixel 340 in the z-direction, but not limited thereto. In other words, the fingerprint sensing element 390 may correspond to the pixels 340 of the electronic device 300 in the present embodiment, and the switching elements 399, the fingerprint scan lines 395, and the fingerprint data lines 397 of the fingerprint sensing element 390 may also correspond to the switching element 349a, the switching element 349b, the switching element 349c or the wires (such as the data lines 347 and the scan lines 345) of the pixel 340, thereby reducing the condition that the light emitting areas of the sub-pixels 341r, the sub-pixel 341g, and the sub-pixel 341b in the pixel 340 is shielded by the fingerprint sensing element 390, which means the situation that the aperture ratios of the sub-pixels 341r, the sub-pixel 341g, and the sub-pixel 341b are lowered. However, since the number of the switching elements 399 (such as four switching elements 399a to 399d) in the fingerprint sensing element 390 is more than the number of the switching elements 349 (such as three switching elements 349a to 349c) in the pixel 340, a blocking layer 398 such as a black matrix layer, disposed on the fingerprint sensing element 390 has to additionally shield the switching element 399d of the fingerprint sensing element 390 which is not overlapped by any switching elements 349. In this way, the shielding area of the blocking layer 398 may be greater than the shielding area when the fingerprint sensing element 390 is not provided. Furthermore, people skilled in the arts should understand that although the electronic device 300 in FIG. 3 is exemplified by disposing the switching element 399d at a corresponding position of the sub-pixel 341r, the practical position of the switching element 399d is not limited thereto. In other embodiments, the switching element 399d may also be disposed at other positions, such as a position corresponding to the sub-pixel 341g, a position corresponding to the sub-pixel 341b, or other suitable positions.

Through the aforementioned arrangements, the switching elements 399, the fingerprint scan lines 395, and the fingerprint data lines 397 in the fingerprint sensing element 390 may overlap the wires (such as the switch elements 349 of the pixel 340, the scan lines 345 and the data lines 347) of the electronic device 300 as much as possible, while the fingerprint sensing technology (such as the ultrasonic fingerprint sensing technology) is integrated into the electronic device 300 of the present embodiment. Accordingly, the shielding area on the light emitting area of the sub-pixels 341r, the sub-pixel 341g, and the sub-pixel 341b in the pixel 340 caused by the fingerprint sensing element 390 may be reduced. On the other hand, although the fingerprint sensing electrodes 391 of the present embodiment still overlap a portion of the touch sensing electrodes 371, the overlapped portion of the touch sensing electrodes 371 and the fingerprint sensing electrodes 391 is about 10% to 70% of the area of the touch sensing electrodes 371 (10%≤area ratio of the overlapped portion≤70%), or about 33% to 55% (33%≤area ratio of the overlapped portion≤55%) of the area of the touch sensing electrodes 371. Then, another portion of the touch sensing electrodes 371 disposed under the fingerprint sensing electrodes 391 is not overlapped with the fingerprint sensing electrodes 391, thereby reducing the influence of the fingerprint sensing electrodes 391 on the touch sensing electrodes 371. Thus, the electronic device 300 of the present embodiment is capable of maintaining the functions of both the fingerprint sensing element 390 and the touch sensing element 370, while integrating the fingerprint sensing element 390 therein.

Figure 4:
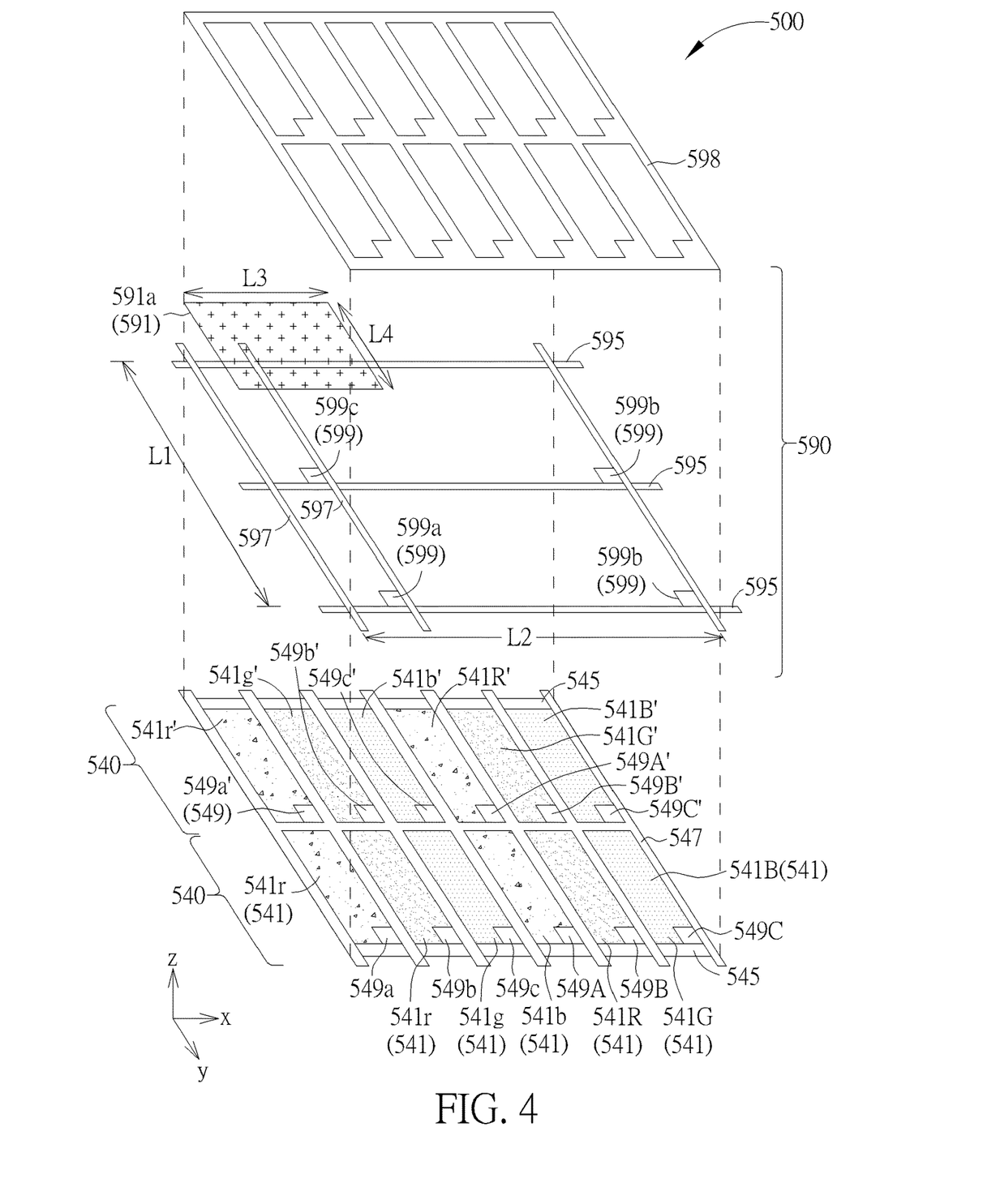
FIG. 4 is a schematic diagram illustrating an electronic device according to a third embodiment of the present disclosure.

Please refer to FIG. 4, which shows an electronic device 500 according to the third embodiment of the present disclosure. Firstly, as shown in FIG. 4, components of the electronic device 500 in the third embodiment are substantially the same as those in the aforementioned second embodiment and may not be redundantly described hereinafter. The difference between the aforementioned embodiments and the present embodiment is mainly in that the fingerprint sensing element 590 may correspond to a plurality of pixels 540, and the pixel aperture ratio is less sacrificed, or to further reduce the overlapped areas of the touch sensing electrodes (not shown in the drawings) and the fingerprint sensing electrodes 591.

Specifically speaking, a pixel 540 of the present embodiment also includes three sub-pixels 541 to display red light, greed light and blue light respectively, and to control the switching elements (such as the thin film transistors) 549, the scan lines 545 and the data lines coupled to the switching elements 549 of the three sub-pixels 341 respectively, wherein the fingerprint sensing element 590 may correspond to four pixels 540, as shown in FIG. 4. Accordingly, four switching elements including a switching element 599a, a switching element 599b, a switching element 599c, and a switching element 599d in the fingerprint sensing element 590 may be disposed respectively corresponding to four sub-pixels including a sub-pixel 549a, a sub-pixel 549a' a sub-pixel 549C, and a sub-pixel 549C' which are belonged to four different pixels 540. Then, the positions of the fingerprint scan lines 595 and the fingerprint data lines 597 may also be optionally overlapped with the positions of a portion of the scan lines 545 and data lines 547 which are belonged to four different pixels 540. Also, people in the arts may easily understand that although the fingerprint sensing element 590 in FIG. 4 is exemplified by disposing the four switching elements including the switching element 599a, the switching element 599b, the switching element 599c, and the switching element 599d at positions corresponding to the switching element 549a, the switching element 549a', the switching element 549C, and the switching element 549C' of the four sub-pixels at the outer side (including the sub-pixel 541r, the sub-pixel 541r', the sub-pixel 541B, and the sub-pixel 541B' in the four different pixels 540), the practical positions of the switching element 599a, the switching element 599b, the switching element 599c, and the switching element 599*d* are not limited thereto. In other embodiments, the switching element 599*a*, the switching element 599*b*, the switching element 599*c*, and the switching element 599*d* of the fingerprint sensing element 590 may be optionally disposed at any positions corresponding to the twelve sub-pixels including the sub-pixel 541*r*, the sub-pixel 541R, the sub-pixel the sub-pixel 541*r'*, the sub-pixel 541R', the sub-pixel 541*g*, the sub-pixel 541G, the sub-pixel 541*g'*, the sub-pixel 541G', the sub-pixel 541*b*, the sub-pixel 541B, the sub-pixel 541*b'*, and the sub-pixel 541B' of the four different pixels 540. For example, the four switching elements including the switching element 599*a*, the switching element 599*b*, the switching element 599*c*, and the switching element 599*d* may be optionally disposed at the positions corresponding to the switching element 549*a*, the switching element 549*a'*, the switching element 549A, and the switching element 549A' of the four red sub-pixels including the sub-pixel 541*r*, the sub-pixel 541R, the sub-pixel 541*r'*, and the sub-pixel 541R', or disposed at the positions corresponding to the switching element 549*b*, the switching element 549*b'*, the switching element 549B, and the switching element 549B' of the four green sub-pixels including the sub-pixel 541*g*, the sub-pixel 541G, the sub-pixel 541*g'*, and the sub-pixel 541G', or disposed at the positions corresponding to the switching element 549*c*, the switching element 549*c'*, the switching element 549C, and the switching element 549C' of the four blue sub-pixels including the sub-pixel 541*b*, the sub-pixel 541B, the sub-pixel 541*b'*, and the sub-pixel 541B', but not limited thereto.

Through these arrangements, the wires of the fingerprint sensing element 590 (such as the fingerprint scan lines 595 and the fingerprint data lines 597) and the switching elements including the switching element 599*a*, the switching element 599*b*, the switching element 599*c*, and the switching element 599*d* may correspond to the four pixels 540 of the electronic device 500. Also, based on process requirements, the switching elements 599 (for example, with a number of 4) may be arbitrarily overlapped with a portion of the switching elements 549 (for example, with a number of 12) in the four pixels 540. In this way, a blocking layer 598 disposed above no longer needs to additionally shield any switching element which is overlapped with the sub-pixels 541, thereby reducing the loss of the aperture ratio. Furthermore, the fingerprint sensing element 590 of the present embodiment may correspond to (or overlap) four pixels 540, but not limited thereto. In another embodiment, the fingerprint sensing element 590 may correspond to (or overlap) more pixels 540 or less pixels, and the fingerprint sensing electrode 591 may also optionally overlap the pixels 540, for example at least two pixels 540, but not limited thereto.

Figure 5:
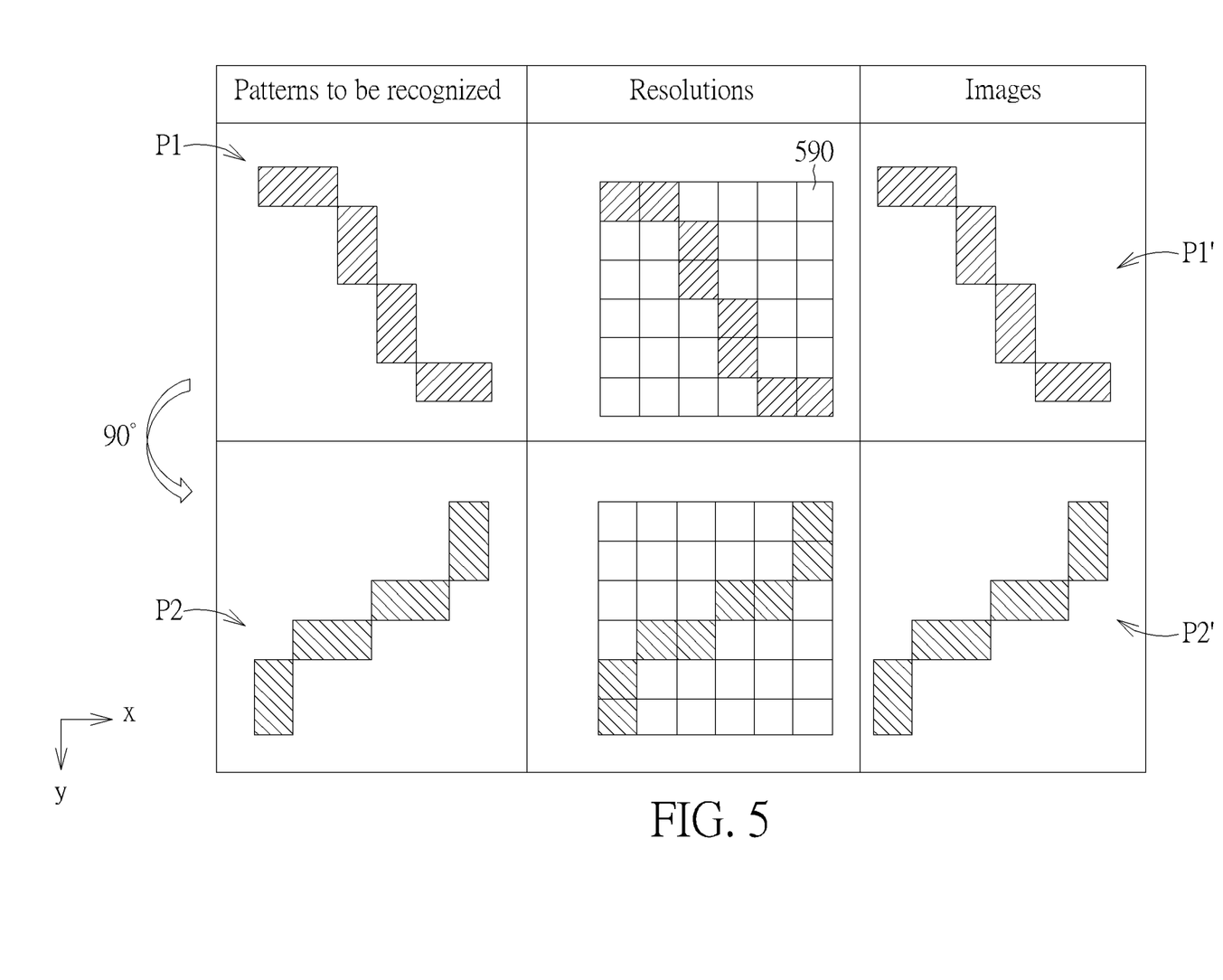
FIG. 5 is a schematic diagram illustrating the graphic recognition function of an electronic device according to the present disclosure.
Figure 6:
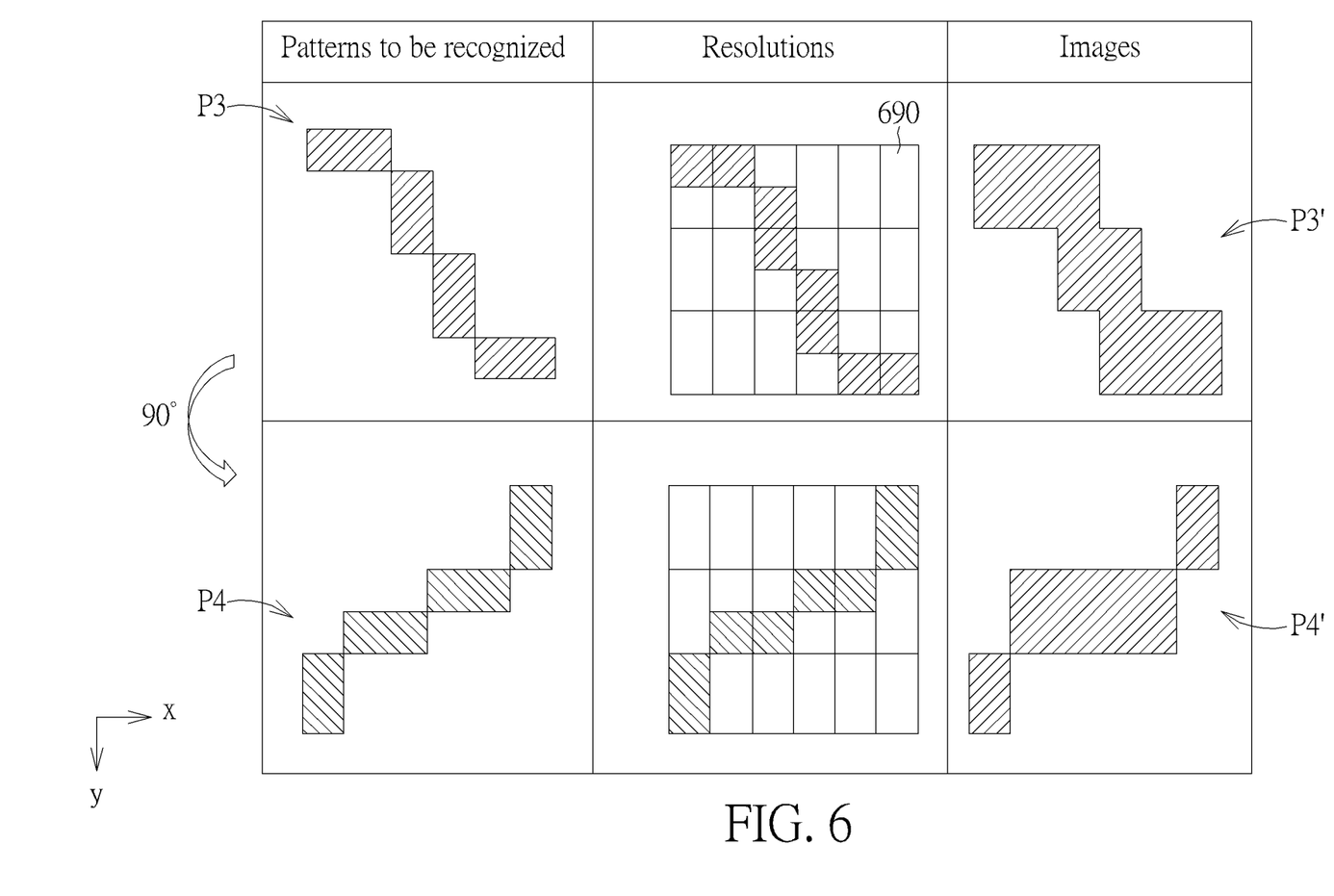
FIG. 6 is another schematic diagram illustrating the graphic recognition function of an electronic device according to the present disclosure.

Please refer to FIG. 5 and FIG. 6, in order to make the fingerprint sensing element 590 have similar resolutions indifferent directions to mitigate image distortion or misjudgments. Specifically, the ultrasonic fingerprint sensing electrode of the fingerprint sensing element 590 may include substantially the same lengths (or called as "pitch") L1, L2 or respectively correspond to the same number of pixels 540 in a first direction (such as the x-direction) and a second direction (such as the y-direction), wherein the first direction may be perpendicular to the second direction, but not limited thereto. For example, the fingerprint sensing element 590 as shown in FIG. 4 corresponds to two pixels 540 in the x-direction and the y-direction respectively, but not limited thereto. As shown in FIG. 4, the length L1 refers to a shortest distance between the upper edge of the uppermost fingerprint scan line 595 corresponding to a fingerprint sensing element 590 and the upper edge of the lowermost fingerprint scan line 595 corresponding to the same fingerprint sensing element 590, and the length L2 refers to a shortest distance between the left edge of the leftmost fingerprint data line 597 corresponding to a fingerprint sensing element 590 to the left edge of the rightmost fingerprint data line 597 corresponding to the same fingerprint sensing element 590. In some embodiments, the fingerprint sensing electrode 591 (only the bottom electrode layer 591*a* thereof is illustrated in FIG. 4) may include substantially the same lengths L3, L4 in the first direction (such as the x-direction) and the second direction (such as the y-direction), but not limited thereto. Accordingly, the fingerprint sensing element 590 and/or the fingerprint sensing electrodes 591 may have square, rhombic or other suitable shapes, such that, the fingerprint sensing element 590 may have similar resolutions in different directions, so as to mitigate the image distortion or misjudgments. Specifically speaking, as shown in FIG. 5, while the fingerprint sensing element 590 has a shape like a square or a rhombus, the resolutions in two different directions (such as the x-direction and the y-direction) are similar to or the same with each other. Then, an image P1' created by the fingerprint sensing element 590 based on a pattern P1 is recognized to be the same as the image of the pattern P1, and an image P2' created by the fingerprint sensing element 590 based on a pattern P2 is recognized to be the same as the image of the pattern P2. In addition, when the pattern P1 is rotated by a certain angle, such as 90 degrees (corresponding to the situation when a finger touches in a different direction) to form a new pattern like the pattern P2, the image P2' created by the fingerprint sensing element 590 is still the same as the image P1' rotated by the certain angle, without causing any problems such as the interpretation errors.

Conversely, if a fingerprint sensing element 690 has different resolutions in different directions (namely, there are different numbers of fingerprint sensing elements 690 in different directions, or a fingerprint sensing elements 690 has different lengths in different directions), the fingerprint sensing element 690 may not have correct judgments in all directions. For example, as shown in FIG. 6, an image P3' created under the resolution of the fingerprint sensing element 690 may be regarded as a representative image of the original pattern P3. When the original pattern P3 is rotated by a certain angle such as 90 degrees (corresponding to the situation when a finger touches in a different direction) to form a new pattern P4, the image P4' created by the fingerprint sensing element 690 and based on the new pattern P4 is different from the rotated representative image P3'. Accordingly, when the fingerprint sensing element 690 has different resolutions in different directions, the image to be recognized will create different images after being rotated by an angle. In other words, when the fingerprint sensing element 690 has different resolutions in different directions, the finger touches indifferent directions may be recognized as different users, thereby resulting in misjudgments.

Figure 7:
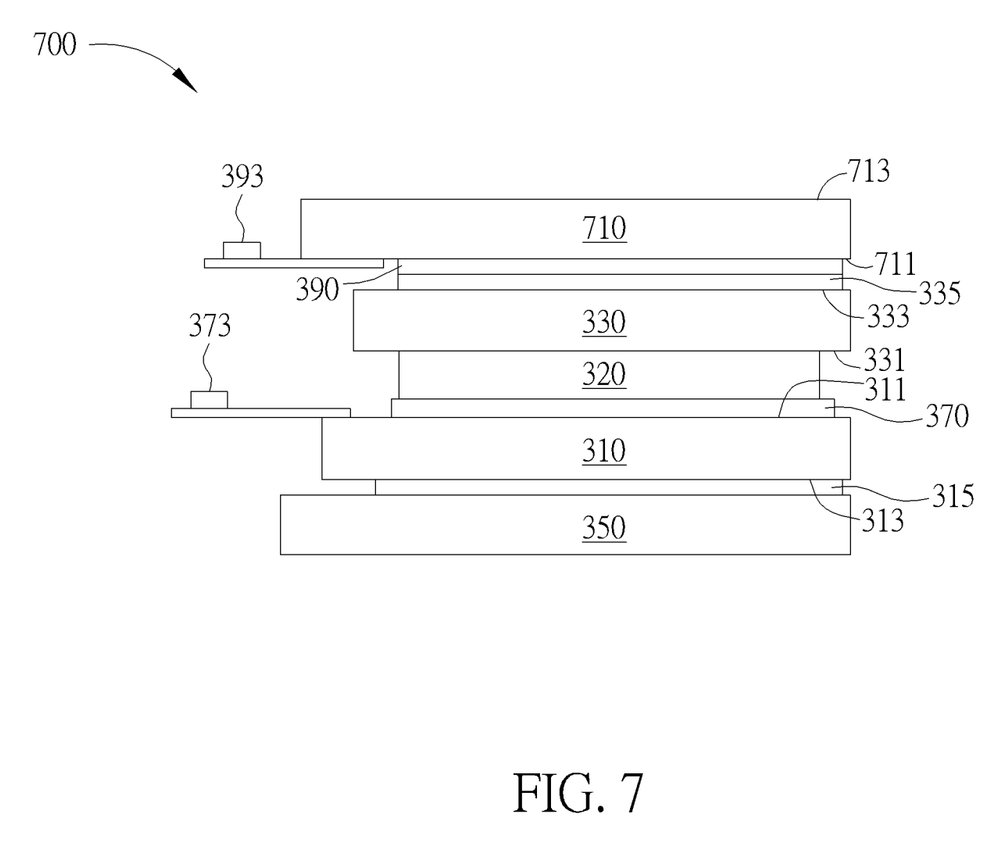
FIG. 7 to FIG. 9 are schematic diagrams illustrating an electronic device according to other embodiments of the present disclosure.
Figure 8:
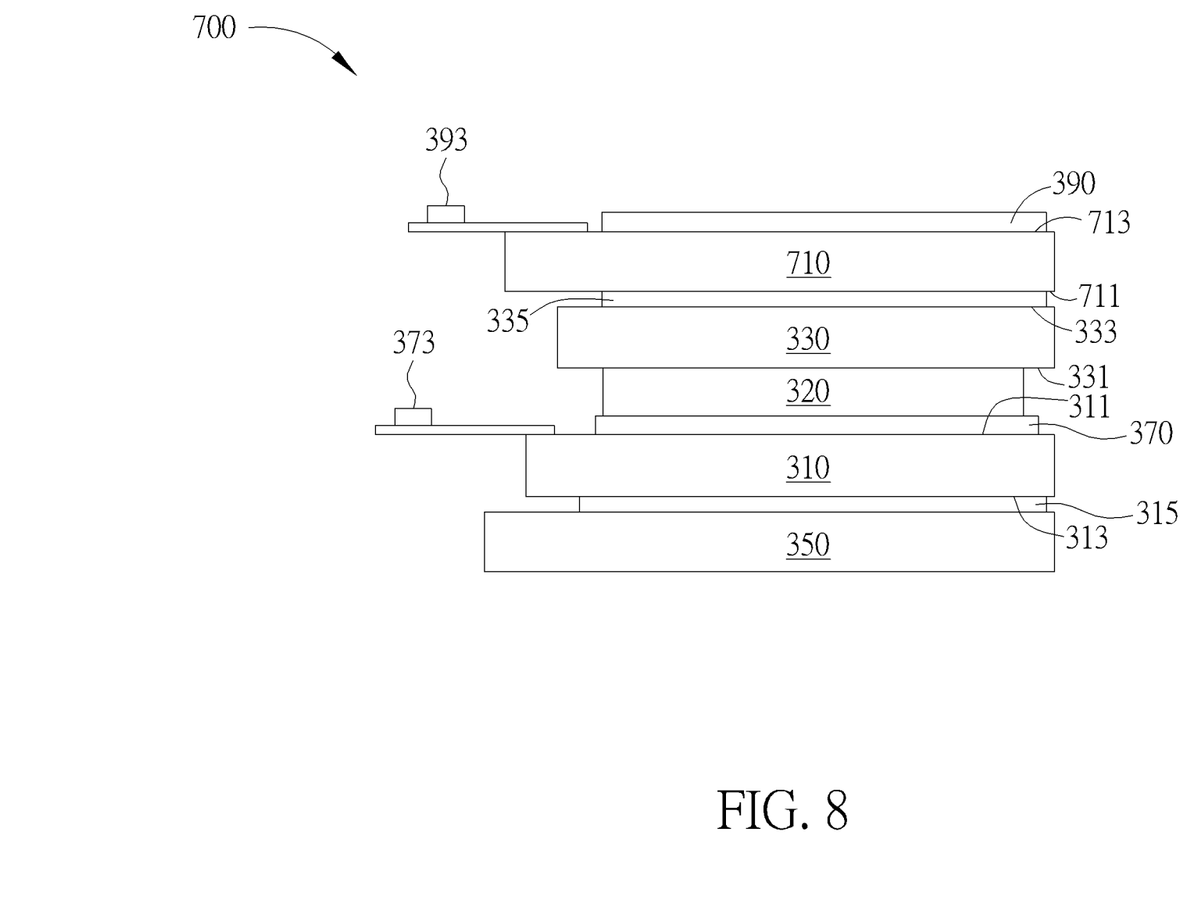
Figure 9:
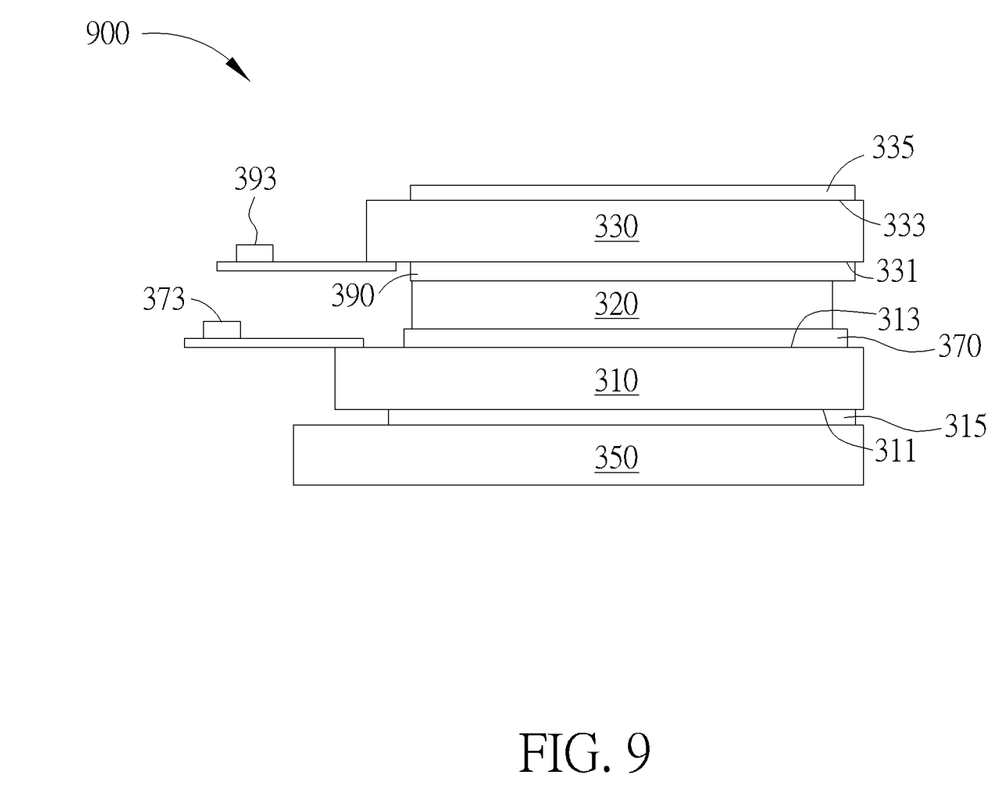

Furthermore, when integrating the aforementioned embodiments of the fingerprint sensing technique (such as the ultrasonic fingerprint sensor) into the electronic device 100 and the electronic device 300, although the fingerprint sensing element 190, the fingerprint sensing element 390, or the fingerprint sensing element 590 may be disposed at the outer side 133 of the second substrate 130 of the electronic device 100, and the outer side 333 of the second substrate 330 of the electronic device 300, people skilled in the arts should understand that the fingerprint sensing element 190, the fingerprint sensing element 390, the fingerprint sensing element 590 or the like disclosed in the present disclosure may also be disposed at other positions of the electronic device 100 and the electronic device 300. As an example, FIG. 7 to FIG. 9 show an electronic device 700 and an electronic device 900 according to other embodiments of the present disclosure, wherein the electronic device 700 and the electronic device 900 also includes the first substrate 310 (having the inner side 311 and the outer side 313 opposite to each other), the bottom polarizer 315, the medium layer 320, the second substrate 330 (having the inner side 331 and the outer side 333 opposite to each other), the top polarizer 335, the back light 350, the touch sensing element 370 (including the touch sensing electrodes 371), the touch sensing circuit 373, and the fingerprint sensing element 390, and features of the aforementioned components are substantially the same as those of the aforementioned second embodiment and third embodiment and may not be redundantly described hereinafter. The difference between the aforementioned embodiments and the present embodiment is mainly in the positions of the fingerprint sensing elements 390.

As shown in FIG. 7 and FIG. 8, the fingerprint sensing element 390 may be optionally disposed on a third substrate 710, but not limited thereto.

Specifically speaking, as shown in FIG. 7, the third substrate 710 also includes an inner side 711 and an outer side 713 opposite to each other, and the inner side 311 faces the second substrate 330. The fingerprint sensing element 390 may be optionally disposed on the inner side 711 of the third substrate 710, over the top polarizer 335. Namely, the fingerprint sensing element 390 is disposed between the third substrate 710 and the top polarizer 335. In another embodiment, the fingerprint sensing element 390 may also be optionally disposed on the outer side 713 of the third substrate 710, such that the third substrate 710 is disposed between the top polarizer 335 and the fingerprint sensing element 390, as shown in FIG. 8.

As shown in FIG. 9, the fingerprint sensing element 390 may also be optionally disposed on the inner side 331 of the second substrate 330, between the medium layer 320 and the second substrate 330. It is noted that, the material of the piezoelectric film 391*b* within the fingerprint sensing electrode 391 generally has a lower melting point, and the temperature of the processes performed on the first substrate 310 and the second substrate 330 may be relative higher than the melting point of the piezoelectric film 391*b*, thereby leading to possible damages to the piezoelectric film 391*b*. Accordingly, when the fingerprint sensing element 390 is disposed on the inner side 331 of the second substrate 330, a material with a relative higher melting point should be used as the piezoelectric film 391*b* of the fingerprint sensing electrode 391 to reduce the possible damages caused by higher process temperatures to the piezoelectric film 391*b*.

Additionally, the electronic device of the present disclosure is not limited to the aforementioned display device, and which may further include alighting device, an antenna device, a sensor device or a tiled device, but is not limited thereto. The electronic device may optionally include a non-rectangular electronic device, a foldable electronic device or a flexible electronic device, such as a flexible liquid crystal (LC) display device or a flexible light emitting diode display device, and the light emitting diode (LED) display device for example includes an organic light emitting diode (OLED) or an inorganic light emitting diode, and the inorganic light emitting diode, for example, includes a mini light emitting diode (mini LED), a micro light emitting diode (micro LED), a quantum-dot light emitting diode (QLED, QDLED), or a light emitting diode with any other suitable materials or any combination of above mentioned light emitting diodes, but is not limited thereto. The antenna device may be a liquid crystal antenna, but is not limited thereto. The tiled device may be a tiled display device or a tiled antenna device, but is not limited thereto. It is noted that the electronic device may be any variants, arrangements or combinations of the above, but is not limited thereto. Also, In the present disclosure, the term "foldable" or "flexible" means that the electronic device may be wound, bent, folded, stretched, flexed, or other similar deformations. In the present disclosure, the term "non-rectangular" means that the appearance of the electronic device is non-rectangular, or the pixel array of the electronic device has a non-rectangular overall appearance.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
   a touch sensing element comprising a plurality of touch sensing electrodes;
   a fingerprint sensing element comprising a plurality of ultrasonic fingerprint sensing electrodes, disposed on the plurality of touch sensing electrodes, wherein a portion of one of the plurality of touch sensing electrodes is not overlapped with one of the plurality of ultrasonic fingerprint sensing electrodes; and
   a plurality of pixels, the plurality of pixels comprising a first sub-pixel, a second sub-pixel, and a third sub-pixel configured to display a red light, a green light, and a blue light respectively, wherein one of the plurality of ultrasonic fingerprint sensing electrodes overlaps at least two of the plurality of pixels.

2. The electronic device of claim 1, wherein one of the plurality of touch sensing electrodes is overlapped with at least two of the plurality of ultrasonic fingerprint sensing electrodes.

3. The electronic device of claim 1, wherein one of the plurality of touch sensing electrodes is overlapped with only one of the plurality of ultrasonic fingerprint sensing electrodes.

4. The electronic device of claim 1, wherein an area of an overlapped portion of one of the plurality of touch sensing electrodes and the plurality of ultrasonic fingerprint sensing electrodes is 10% to 70% of an area of the one of the plurality of the touch sensing electrodes.

5. The electronic device of claim 1, wherein the one of the plurality of ultrasonic fingerprint sensing electrodes is electrically connected to at least four thin-film transistors, wherein the at least four thin-film transistors are disposed respectively corresponding to four sub-pixels.

6. The electronic device of claim 1, wherein the first sub-pixel comprises a first thin-film transistor, the second sub-pixel comprises a second thin-film transistor, the third sub-pixel comprises a third thin-film transistor, one of the plurality of ultrasonic fingerprint sensing electrodes is electrically connected to at least one fourth thin-film transistor, and the at least one fourth thin-film transistor is overlapped with one of the first thin-film transistor, the second thin-film transistor, and the third thin-film transistor.

7. The electronic device of claim 1, wherein one of the plurality of ultrasonic fingerprint sensing electrodes corresponds to a first number of pixels in a first direction, and corresponds to a second number of pixels in a second direction, wherein the first number is equal to the second number, and the first direction is perpendicular to the second direction.

8. The electronic device of claim 1, wherein the plurality of ultrasonic fingerprint sensing electrodes have a first length in a first direction and have a second length in a second direction, wherein the first length is equal to the second length, and the first direction is perpendicular to the second direction.

9. The electronic device of claim 1, further comprising:
a first substrate;
a second substrate; and
a liquid crystal layer disposed between the first substrate and the second substrate, wherein the plurality of touch sensing electrodes are disposed between the first substrate and the liquid crystal layer.

10. The electronic device of claim 9, wherein the second substrate comprises a first side and a second side, the first side faces the liquid crystal layer, the second side is opposite to the first side, and the plurality of ultrasonic fingerprint sensing electrodes are disposed on the first side or the second side.

11. The electronic device of claim 10, further comprising:
a polarizer disposed on the second side of the second substrate, wherein the plurality of ultrasonic fingerprint sensing electrodes are disposed between the polarizer and the second substrate.

12. The electronic device of claim 9, further comprising:
a third substrate disposed on the second substrate, wherein the third substrate comprises a third side and a fourth side, the third side faces the second substrate, the fourth side is disposed opposite to the third side, and the plurality of ultrasonic fingerprint sensing electrodes are disposed on the third side or the fourth side.

13. The electronic device of claim 9, wherein the plurality of ultrasonic fingerprint sensing electrodes respectively comprise a top electrode layer, a piezoelectric film, and a bottom electrode layer stacked sequentially.

14. The electronic device of claim 13, wherein the plurality of touch sensing electrodes are partially overlapped the bottom electrode layers of the plurality of ultrasonic fingerprint sensing electrodes.

15. The electronic device of claim 1, further comprising:
a fingerprint sensing circuit coupled to the plurality of ultrasonic fingerprint sensing electrodes.

16. The electronic device of claim 1, further comprising:
a touch sensing circuit coupled to the plurality of touch sensing electrodes.

17. The electronic device of claim 1, wherein the plurality of touch sensing electrodes are disposed with an interval.

18. The electronic device of claim 1, wherein the plurality of ultrasonic fingerprint sensing electrodes comprise indium tin oxide.

19. The electronic device of claim 1, wherein the plurality of ultrasonic fingerprint sensing electrodes and the plurality of touch sensing electrodes comprise a same material.

* * * * *